(12) United States Patent
Thomson (10) Patent No.: US 9,531,876 B2
(45) Date of Patent: Dec. 27, 2016

(54) CONTACT CENTER REPLAY

(71) Applicant: Avaya, Inc., Basking Ridge, NJ (US)

(72) Inventor: Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 394 days.

(21) Appl. No.: 14/270,550

(22) Filed: May 6, 2014

(65) Prior Publication Data

US 2015/0326722 A1 Nov. 12, 2015

(51) Int. Cl.
| | |
|---|---|
| *H04M 3/00* | (2006.01) |
| *H04M 5/00* | (2006.01) |
| *H04M 3/51* | (2006.01) |
| *H04M 3/42* | (2006.01) |
| *H04M 3/20* | (2006.01) |
| *H04M 7/00* | (2006.01) |
| *H04M 1/656* | (2006.01) |
| *H04M 1/65* | (2006.01) |

(52) U.S. Cl.
CPC ............... *H04M 3/51* (2013.01); *H04M 3/20* (2013.01); *H04M 3/42221* (2013.01); *H04M 3/5183* (2013.01); *H04M 1/651* (2013.01); *H04M 1/656* (2013.01); *H04M 3/5175* (2013.01); *H04M 7/0042* (2013.01); *H04M 2201/40* (2013.01); *H04M 2203/301* (2013.01); *H04M 2203/402* (2013.01); *H04M 2203/552* (2013.01); *H04M 2203/558* (2013.01)

(58) Field of Classification Search
CPC ............ H04M 3/42221; H04M 2201/40; H04M 2203/403; H04M 2203/402; H04M 2203/301; H04M 1/651; H04M 1/656

USPC ...................................... 379/265.07

See application file for complete search history.

(56) References Cited

U.S. PATENT DOCUMENTS

| | | | |
|---|---|---|---|
| 7,139,978 B2 | 11/2006 | Rojewski et al. | |
| 7,184,539 B2* | 2/2007 | Colson | H04M 3/51 379/265.01 |
| 7,706,520 B1* | 4/2010 | Waterson | H04M 3/42221 379/265.02 |
| 8,315,374 B2 | 11/2012 | Perlmutter | |
| 9,031,222 B2* | 5/2015 | Wolfeld | H04M 3/00 379/265.03 |

(Continued)

OTHER PUBLICATIONS

"Call recording software solution designed for contact centers", Monet Software, Nov. 25, 2013, 2 pages, retrived from http://www.monetsoftware.com/call-recording-software-features/.

(Continued)

*Primary Examiner* — Nafiz E Hoque
(74) *Attorney, Agent, or Firm* — Sheridan Ross P.C.

(57) ABSTRACT

Contact centers often record customer-agent communications for training, quality control, and other purposes. Supervisors often contribute to the communications in the form of voice messages only the agent can hear (e.g., whisper mode) and/or text messages displayed on a screen and optionally documents or other content that may be provided or shared by the supervisor to the agent. Capturing the supervisor's contribution to a communication is provided to enable later playback or review of the communication to include all inputs and enable a more complete understanding of the actions that were or were not taken.

20 Claims, 4 Drawing Sheets

(56) References Cited

U.S. PATENT DOCUMENTS

| | | | |
|---|---|---|---|
| 2010/0104087 A1* | 4/2010 | Byrd | H04M 3/42221 |
| | | | 379/265.09 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2013/0129071 A1* | 5/2013 | Teitelman | H04M 3/51 |
| | | | 379/265.06 |
| 2014/0016761 A1* | 1/2014 | Werner | H04M 3/5133 |
| | | | 379/88.11 |

OTHER PUBLICATIONS

"Impact 360 Recording", Verint, Nov. 25, 2013, 1 page, retrieved from http://www.verint.com/solutions/enterprise-workforce-optimization/products/recording/impact-360®-recordingtm.

"Call Center Recording", Nice, Nov. 25, 2013, 1 page, retrieved from http://www.nice.com/call-center-recording.

* cited by examiner

```
                                                              400
<Contact>
    <Agent>Smith</Agent>
    <Customer>Jones</Customer>
    <AgentCustomerText>null</AgentCustomerText>
    <AgentCustomerVideo>null<AgentCustomerVideo>
    <AgentCustomerVoice>xxyyzz1.mp3</AgentCustomerVoice>
    <SupervisorWhisper>
        <SupervisorName>Green</SupervisorName>
        <SupervisorWhisperText>aabbcc3.txt</SupervisorWhisperText>
    </SupervisorWhisper>
    <SupervisorWhisper>
        <SupervisorName>Green</SupervisorName>
        <SupervisorWhisperText>aabbcc4.txt</SupervisorWhisperText>
    </SupervisorWhisper>
    <SupervisorWhisper>
        <SupervisorName>White</SupervisorName>
        <SupervisorWhisperVoice>aabbcc5.mp3</SupervisorWhisperVoice>
    </SupervisorWhisper>
</Contact>
```

FIG. 4 select * from Contact where SupervisorName="Green" ⟵500

CONTACT CENTER REPLAY

FIELD OF THE DISCLOSURE

The present disclosure is generally directed toward recording contact center communications.

BACKGROUND

Contact center agents and supervisors are constantly inundated with data on customer interactions. One work item may have a long history, multi-channel engagement, and one or more transactions. The interactions are commonly known as dialogs, which can include many turns and back-and-forth communications with the customer.

Supervisors often participate in transactions with agents and/or customers which may contribute to the success, or failure, of an interaction. Managers, who may or may not be the same supervisor, often review customer interactions and historical data to ensure objectives are being met and dialogs are handled appropriately and effectively. Supervisors often rely on memory, anecdotal information, and historical statistics and data to make suggestions and corrections to agents based on performance in dialogs after the conclusion of the work item(s). Contact center changes and training materials may even be made based on the successes or failures of dialogs.

SUMMARY

It is with respect to the above issues and other problems that the embodiments presented herein were contemplated.

In many contact centers, there are features and mechanisms to record interactions between agents and customers. Absent from such systems is the ability to record the supervisor's contributions and the agent/supervisor interactions that exclude the customer (e.g., whisper pages, direct Instant Messaging (IM), etc.). Capturing supervisor interactions would be beneficial, such as for the formulation of training materials and for agent performance reviews.

As is disclosed with respect to certain embodiments, real-time, flexible recording between supervisors and agents is provided to facilitate training, assistance, quality review, and intervention opportunities for agents and supervisors.

Prior art contact centers fail provide supervisor monitoring (e.g., being able to monitor interactive coaching, like whisper mode and chat) for interactions between a supervisor and an agent. Contact center systems primarily focus on monitoring agents, identifying good and bad agent behavior, etc., however, such systems fail to include meaningful monitoring of supervisors. Provided with respect to certain embodiments herein, a supervisor may be monitored and the supervisor's impact evaluated, in real time or at a later time. Accordingly, how a supervisor performs and how their coaching method affects, positively or negatively a communication, an agent, and/or a contact center may be determined and managed accordingly.

In certain embodiments, a contact center recording solution is provided that is operable to enable recording and/or transcription of supervisor-to-agent interactions and allow for replay of such interactions. The recordings may be made available in the future or for analysis. The recordings may incorporate voice calls, transcripts, Instant Messages (IM), desktop images, research, web information, and/or any other session information.

One or more exchanges between a supervisor and an agent are recorded. The system is operable to capture and replay all, or a selected portion, of the content for playback and analysis in real-time or at a later time. The exchange may be based on a particular channel or mode (e.g., voice in whisper mode, text chat, etc.). In another embodiment, the recording may include capturing the agent's desktop, such as any on-screen interactions between the agent, customer, and/or supervisor. Furthermore, with a Collaboration Environment, there are additional communication mediums provided and available to be recorded for capturing supervisors and agent interactions. Snap-ins may also be used for capturing the interactions.

In certain embodiments, the system may capture, for example, any dialog (e.g., IM, voice including whisper, etc.) occurring directly between the supervisor and the agent. The system may optionally capture data/screen sharing from agent to supervisor, the agent script, and/or other tools and application data used during the transaction. Voice may be made available as a recording and/or as converted text.

Recordings may be stored in a database so that the data can be accessible quickly, such as by a query. The records of the database may be referenced based on call, agent, supervisor, customer, work item number, subject, timestamp, location, referenced documents, etc.

The recordings provided herein, may be used in a different ways. For example, the supervisor may revisit some of the material while assisting the agent or another agent. The recordings can also be used for both supervisor performance reviews and agent performance reviews. The recordings can highlight what a supervisor did well or did poorly, as well as how an agent listened and followed directions from a supervisor. The recordings can additionally be used by quality managers, trainers, supervisors, etc.

In one embodiment, a method is disclosed, comprising: accessing a communication on an electronic communication medium, between an agent of a contact center, a supervisor of the contact center, and a customer external to the contact center and comprising a first, second, and third portion thereof; wherein the first portion of the communication is provided by the customer and received by the agent and the supervisor; wherein the second portion of the communication is provided by the agent and received by the supervisor and the customer; wherein the third portion of the communication is provided by the supervisor and received by the agent; and recording the communication, including the first, second, and third portions thereof.

In another embodiment, a system is disclosed, comprising: a network interface; a processor; a database; and wherein the network interface is operable to facilitate, at least a portion of, a communication between an agent of a contact center, a supervisor of the contact center, and a customer external to the contact center and comprising a first, second, and third portion thereof; wherein the first portion of the communication is provided by the customer and received by the agent and the supervisor; wherein the second portion of the communication is provided by the agent and received by the supervisor and the customer; wherein the third portion of the communication is provided by the supervisor and received by the agent; and wherein the processor is operable to cause the database to record the communication, including the first, second, and third portions thereof.

In yet another embodiment, a non-transitory computer readable medium is disclosed with instructions stored thereon that when read by the computer cause the computer to perform: accessing a communication on an electronic communication medium, between an agent of a contact center, a supervisor of the contact center, and a customer external to the contact center and comprising a first, second, and third portion thereof; wherein the first portion of the communication is provided by the customer and received by the agent and the supervisor; wherein the second portion of the communication is provided by the agent and received by the supervisor and the customer; wherein the third portion of the communication is provided by the supervisor and received by the agent; and recording the communication, including the first, second, and third portions thereof.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
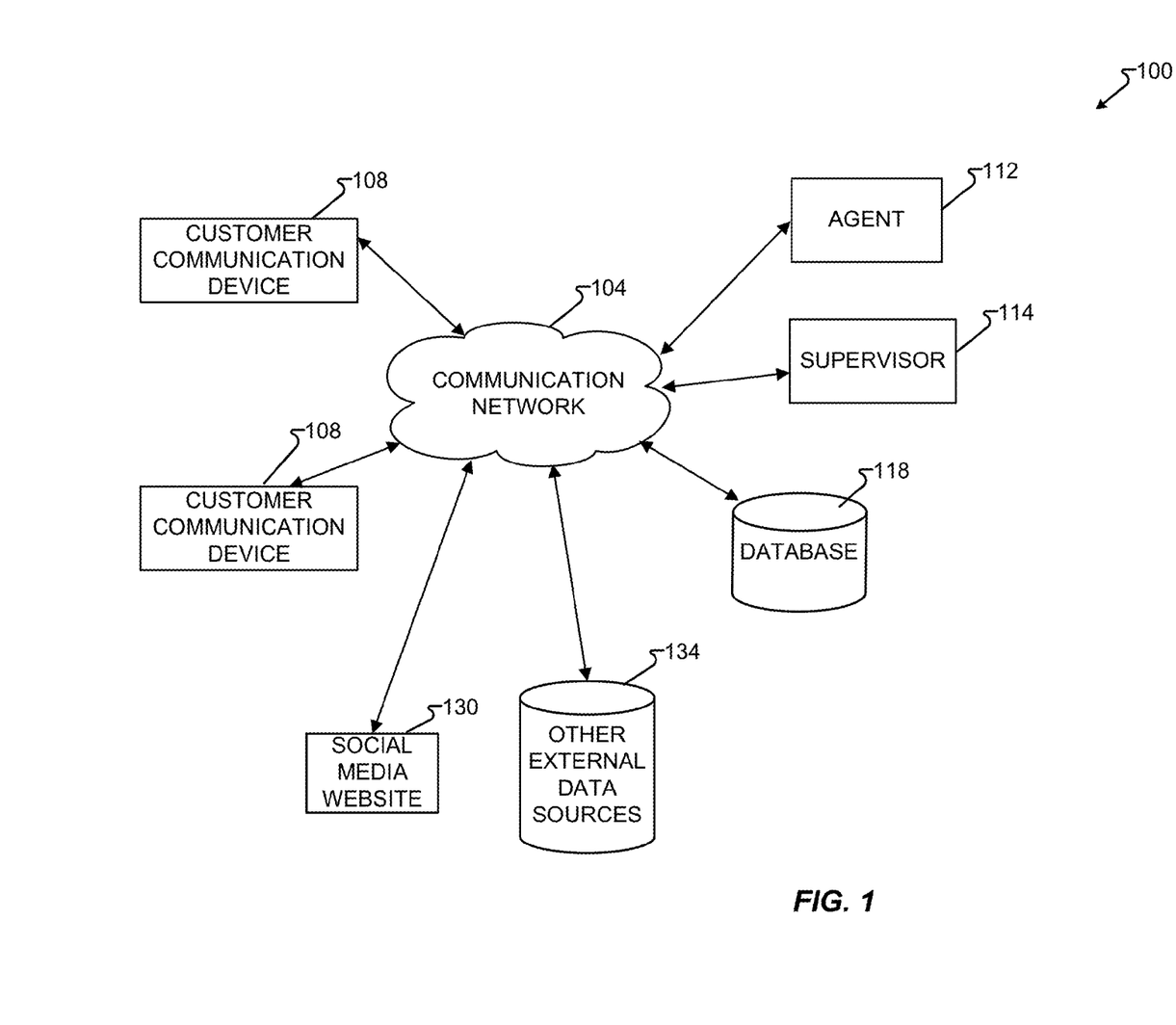
FIG. 1 depicts a first communication system in accordance with embodiments of the present disclosure.

FIG. 1 shows an illustrative embodiment of a first communication system 100 in accordance with at least some embodiments of the present disclosure. The communication system 100 may be a distributed system and, in some embodiments, comprises a communication network 104 connecting one or more communication devices 108. In turn communication network 104 may be connected to at least one agent 112 and at least one supervisor 114, such that agent 112 can be routed and process work items received via communication network 104 from communication devices 108, social media website 130, and other external data sources 134.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at a work assignment mechanism of the contact center, but rather may be on some other server in the communication network 104 where it is harvested by the work assignment mechanism, which generates a work item for the harvested communication. An example of such a harvested communication includes a social media communication that is harvested from a social media website 130. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources, such as agent 112. The type of medium used by the communication device 108 to communicate with other communication devices 108 or agent 112 may depend upon the communication applications available on the communication device 108.

In one embodiment, a message is generated by customer communication device 108 and received, via communication network 104, and routed to agent 112. The message received by a contact center is generally, and herein, referred to as a "contact."

In another embodiment, supervisor 114 may communicate with agent 112. Agent 112 maybe currently engaged in a telephonic conversation with a customer and supervisor 112 is operable to hear the customer and agent portions of the conversation but only be heard by the agent ("whisper mode"). Alternatively, agent 112, customer, and supervisor 114 may be engaged in a three-way conversation ("barge mode"). Other forms of whisper and barge modes may be implemented, such as by supervisor 114 sending text or instant messages to agent 112 who is engaged in voice, text, video, or other mode of conversation with a customer. In a collaborative system, documents, websites, and/or other content may be shared on a display associated with agent 112 and supervisor 114 and, optionally, a customer.

Figure 2:
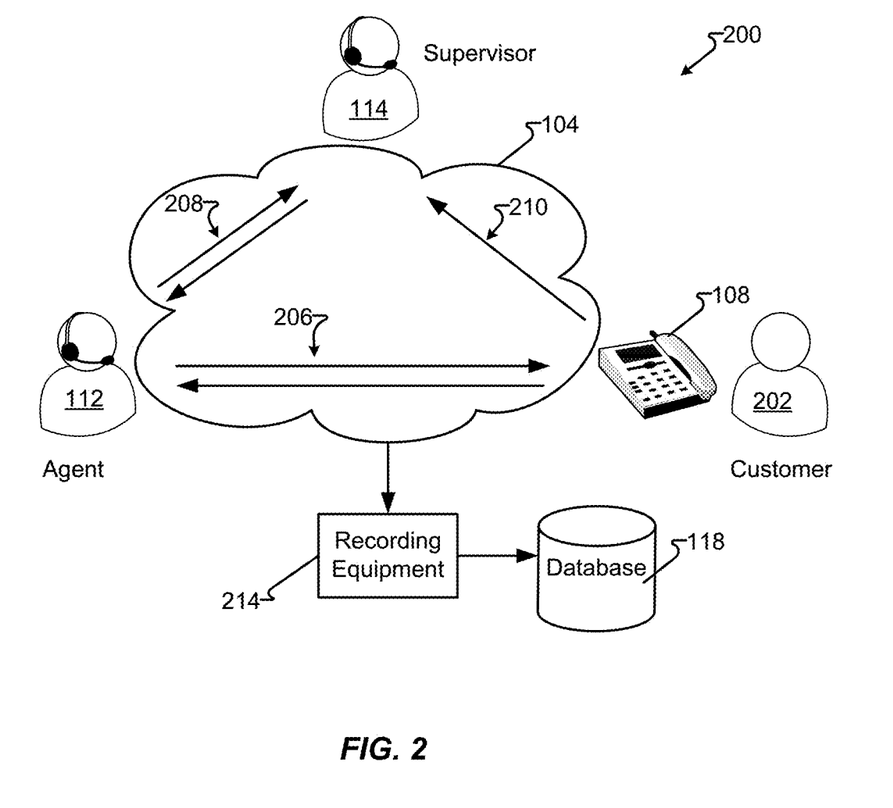
FIG. 2 depicts a second communication system in accordance with embodiments of the present disclosure.

FIG. 2 shows an illustrative embodiment of second communication system 200 in accordance with at least some embodiments of the present disclosure. Communication system 200 may be similar or identical to communications system 100, although such a similarity is not a requirement. In one embodiment, agent 112, supervisor 114, and customer 202 via customer device 108, are engaged in a communication.

Agent 112 and customer 202 are engaged in two-way communication 206, agent 112 and supervisor 114 are engaged in two-way communication 208, and customer 202 and agent 114 are engaged in one-way communication 210. Customer 202 may not have specific knowledge of supervisor 114 and/or communication 210. The durations of communications 206, 208, 210 may be the same or different. For example, supervisor 114 may initiate communication 208 and communication 210 after communication 206 has been established. Similarly, supervisor may terminate communications 208,210 while communication 206 continues. Optionally, communication 208 may be preserved upon communication 206, 210 ending (e.g., customer 202 hangs-up, disconnects, etc.).

Communications network 104 facilitates, at least a portion of, an electronic and/or optoelectronic communication. As more fully described with respect to FIG. 1, communications network 104 may encompass one or more of a variety of communication equipment and support various communications modes (e.g., voice, text, video, image, document, webpage, etc.). Agent 112 and supervisor 114 may be co-located, even at the same physical terminal, located relatively close proximity (e.g., different area of a floor space, different floor of a building, etc), or remotely located (e.g., dissimilar buildings, cities, continents, etc.). Accordingly, communications network 104 is embodied to accommodate the various locations of agent 112, supervisor 114, and customer 202.

In one embodiment, recording equipment 214 is connected to communication network 104. In another embodiment, recording equipment 214 is integrated, in whole or in part, into one or more devices forming at least a portion of communication network 104. Recording equipment 214 captures communications 208, 206, 210 for storage in database 118.

In one embodiment, database 118 is a database operable to store text, voice, images, video, documents, or other aspects of communication utilized in any one or more of communications 206, 208, 210. Database 118 may index, sort, label, set points, organize or otherwise cause any one or more communications 206, 208, 210 or any portion or content thereof, to be associated with a time, party creating, party receiving, line identifier, and/or other aspect of a communication or portion thereof that may be determined and selected by a contact center. In one embodiment, database 118 may be a relational database, flat file, table, or other storage paradigm. In another embodiment, database may be a cache and/or memory.

Figure 3:
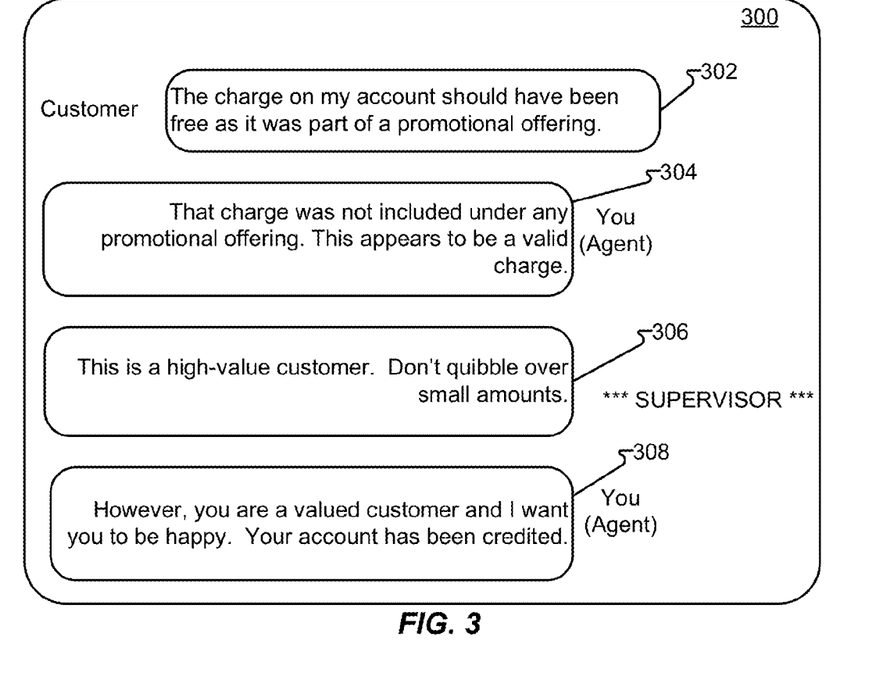
FIG. 3 depicts a display in accordance with at least some embodiments of the present disclosure.

FIG. 3 shows an illustrative embodiment of the content of display 300 in accordance with at least some embodiments of the present disclosure. In one embodiment, display 300 is associated with agent 112. For example, supervisor 114 may type messages for display on display 300 as a portion of communication 208 while agent 112 is engaged in a voice conversation with customer 202. In another embodiment, display 300 may display the text of a text-to-speech function from voice communications provided by supervisor 114 and/or customer 202.

In one embodiment, display 300 is presenting a text exchange between agent 112, customer 202, and customer 202. Customer 202 provides text portion 302; agent 112 provides text portions 304, 308; and supervisor 114 provides text portions 306. In another embodiment, portion 306 is a representation of a spoken message delivered by supervisor 114. In yet another embodiment, portion 306 is a text transcription of a spoken message delivered by supervisor 114.

Figure 4:
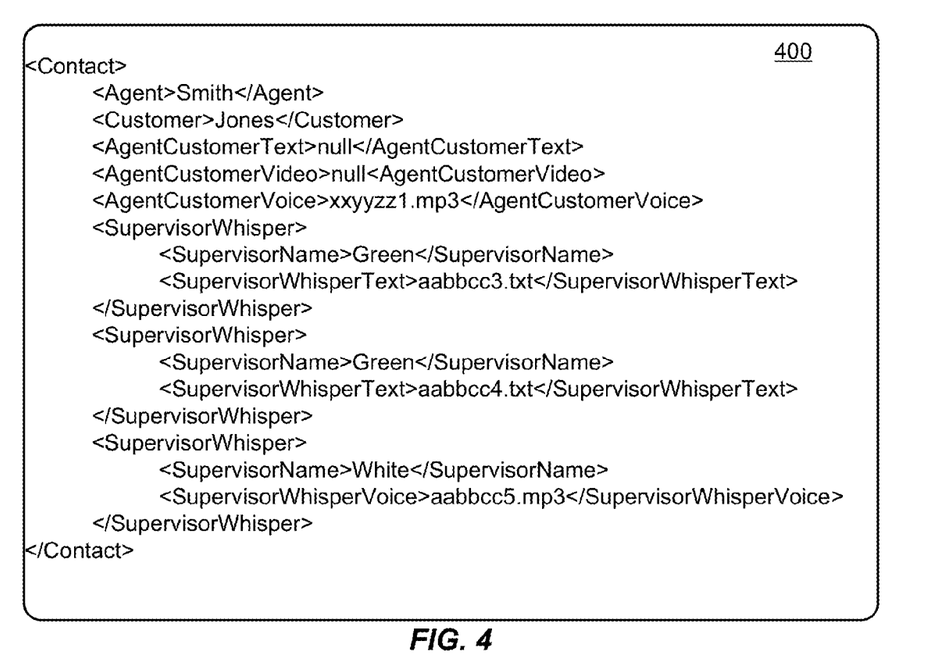
FIG. 4 depicts an organizational paradigm of recordings in accordance with at least some embodiments of the present disclosure.

FIG. 4 shows an illustrative embodiment of an organizational paradigm of recordings in accordance with at least some embodiments of the present disclosure. In one embodiment, text 400 is XML and identifies a plurality of attributes associated with a communication. For example, the date, time, name of supervisor, and/or other aspects as may be selected as a matter of design choice are provided such that recordings may be properly identified and enable more accurate and complete storage and/or retrieval of information.

In another embodiment, text 400 illustrates attributes stored in database 118 or other storage repository. In other embodiments, the storage of data in, for example, database 118 is organized as a relational database, flat file, index, pointers, or other storage paradigm. In another embodiment, recordings are identified with respect to identifying characteristics or portions thereof, and the content of the storage is provided to database 118.

In still another embodiment, markers may be provided within a particular recording, number of recordings, or external. For example, "agent smith speaking: 3.03:01.3-03: 07:49.2" would identify the speaking portion of a recording with respect to a particular individual or other attribute." While XML is well known and provides certain metadata implementation advantages, other forms of metadata may be employed. For example, a header of a file indicating, for example, "Shared Desktop Image sent by supervisor: image.png."

Figure 5:
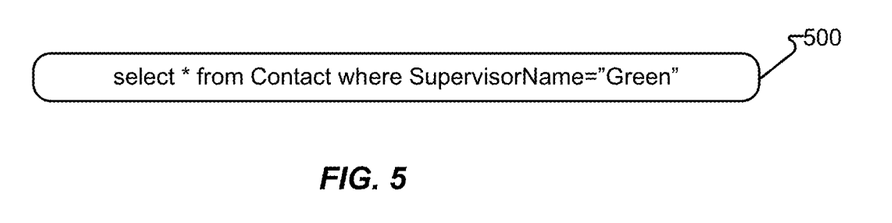
FIG. 5 depicts a retrieval script in accordance with at least some embodiments of the present disclosure.

FIG. 5 shows an illustrative embodiment of retrieval script 500 in accordance with at least some embodiments of the present disclosure. In one embodiment, script 500 is executed to, for example, retrieve all records having a specified supervisor name (e.g., "Green"). Script 500 may be SQL, a program, or other means by which recordings and/or portions thereof, may be retrieved from database 118.

In other embodiments, whereby the form of stored data in, for example, database 118 is accessible by other means, an associated retrieval means is contemplated. For example, a record stored in a fixed-width format may be accessed by, for example, matching a variable against a known position within a record.

Figure 6:
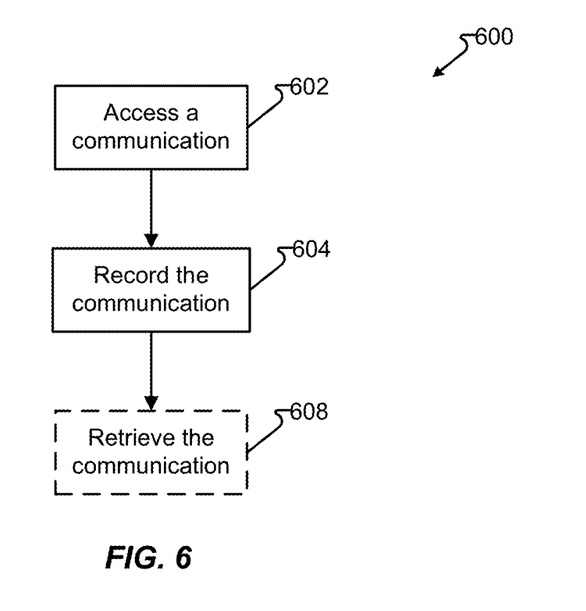
FIG. 6 depicts a process in accordance with at least some embodiments of the present disclosure.

FIG. 6 shows an illustrative embodiment of process 600 in accordance with at least some embodiments of the present disclosure. In one embodiment, step 602 accesses a communication between agent 112 and customer 202 and further including a supervisor's 114 input to agent 112, such as communication in a whisper mode. The communication may be one or more of text, voice, video, images, documents, or other communications. Step 604 records the communication, including the input of supervisor 114. The recorded communication is then stored in a media and optionally accessible in step 608.

As a further option, accessed recordings may be further utilized to provide a replay of a communication session with all inputs available. In particular, the input of supervisor 114 to agent 112. In still another option, human and/or machine-analysis may be provided to for example, analyze the supervisor's 114 input in terms of emotion, appropriateness, resulting resolution or insertion of confusion on the part of agent 112, length of call, and so on. For example one supervisor 114 may offer little input to one or more agents 112. Another supervisor 114 may provide input but the reaction from agent 112 is one of confusion and/or hesitation. As a result, supervisor 114 may be notified of incorrect and/or inappropriate input. As a benefit, supervisor 112 may be notified of actions performed that are above or below a threshold, cause problems, resolve problems, or other condition as may be determined as a matter of design choice.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
 accessing a communication on an electronic communication medium, between an agent of a contact center, a supervisor of the contact center, and a customer external to the contact center;
 wherein the communication further comprises a first portion provided by the customer for reception by the agent and the supervisor;
 wherein the communication further comprises a second portion provided by the agent for reception by the supervisor and the customer;
 wherein the communication further comprises a third portion provided by the supervisor for reception by the agent;
 recording the communication, including the first, second, and third portions thereof, and wherein the first portion, second portion, and third portion comprise voice communication;
 transcribing at least the third portion; and
 wherein the step of recording, comprises saving the transcription.

2. The method of claim 1, wherein the third channel further comprises a textual communication.

3. The method of claim 1, wherein the step of recording further comprises:
 identifying the supervisor; and
 the step of recording, further comprising storing the third portion associated with at least the identity of the supervisor.

4. The method of claim 1, further comprising:
 capturing a timestamp of the third portion; and
 the step of recording, further comprising storing the third portion associated with at least the timestamp.

5. The method of claim 1, further comprising:
 presenting the third portion on a display viewable by the agent;
 capturing an image of the display; and
 wherein the step of recording, further comprises, storing the captured image.

6. The method of claim 1, wherein at least one of the first portion, second portion, and third portion comprise an image.

7. The method of claim 6, wherein the image comprises a captured image of the agent's desktop.

8. A system, comprising:
 a network interface;
 a processor;
 a database; and
 wherein the network interface facilitates, at least a portion of, a communication between an agent of a contact center, a supervisor of the contact center, and a customer external to the contact center;
 wherein the communication further comprises a first portion provided by the customer for reception by the agent and the supervisor;
 wherein the communication further comprises a second portion provided by the agent for reception by the supervisor and the customer;
 wherein the communication further comprises a third portion provided by the supervisor for reception by the agent;
 wherein the processor causes the database to record the communication, including the first, second, and third portions thereof, and wherein the first portion, second portion, and third portion comprise voice communications;
 wherein the processor transcribes at least the third portion; and
 wherein the step of recording, comprises saving the transcription.

9. The system of claim 8, wherein the third channel comprises a textual communication.

10. The system of claim 8, further comprising:
 the processor is further operable to identifying the supervisor; and
 the database is further operable to store the third portion associated with at least the identity of the supervisor.

11. The system of claim 8, wherein:
 the processor is further operable to capture a timestamp of the third portion; and
 the database is further operable to store the third portion associated with at least the timestamp.

12. The system of claim 8, further comprising:
 a display logically attached to the network interface;
 the processor being further operable to cause the third portion on a display to be presented on the display, capturing an image of the display; and wherein the database is further operable to store the captured image.

13. The system of claim 8, wherein at least one of the first portion, second portion, and third portion comprise a video.

14. The system of claim 8, wherein at least one of the first portion, second portion, and third portion comprise an image.

15. A system, comprising:
means for accessing a communication on an electronic communication medium, between an agent of a contact center, a supervisor of the contact center, and a customer external to the contact center;
wherein the communication further comprises a first portion provided by the customer for reception by the agent and the supervisor;
wherein the communication further comprises a second portion provided by the agent for reception by the supervisor and the customer;
wherein the communication further comprises a third portion provided by the supervisor for reception by the agent;
means for recording the communication, including the first, second, and third portions thereof, and wherein the first portion, second portion, and third portion comprise voice communications;
means for transcribing at least the third portions; and
wherein the means of recording, further comprise means for saving the transcription.

16. The system of claim 15, wherein the third channel further comprises a textual communication.

17. The system of claim 15, further comprising:
means for identifying the supervisor; and
the means for recording, further comprise, means for storing the third portion associated with at least the identity of the supervisor.

18. The system of claim 15, further comprising:
means for presenting the third portion on a display viewable by the agent;
means for capturing an image of the display; and
wherein the means for recording, further comprise, means for storing the captured image.

19. The system of claim 15, wherein at least one of the first portion, second portion, and third portion comprise an image.

20. The method of claim 19, wherein the image comprises a captured image of the agent's desktop.

* * * * *

UNITED STATES PATENT AND TRADEMARK OFFICE
CERTIFICATE OF CORRECTION

PATENT NO. : 9,531,876 B2
APPLICATION NO. : 14/270550
DATED : December 27, 2016
INVENTOR(S) : Rodney A. Thomson It is certified that error appears in the above-identified patent and that said Letters Patent is hereby corrected as shown below:

In the Claims

At Column 12, Line 3, please delete "portions" and insert --portion-- therein.

Signed and Sealed this
Twenty-first Day of March, 2017

Michelle K. Lee
*Director of the United States Patent and Trademark Office*